INVENTORS
HAROLD F. B. WATTS
WILLIAM G. COXON

United States Patent Office 3,064,775
Patented Nov. 20, 1962

3,064,775
CONTROL SYSTEM FOR MARINE POWER PLANT
Harold Frank Buckle Watts and William George Coxon,
London, England, assignors to D. Napier & Son Limited, London, England, a company of Great Britain
Filed Mar. 11, 1960, Ser. No. 14,332
Claims priority, application Great Britain Mar. 13, 1959
11 Claims. (Cl. 192—.098)

This invention relates to a control system for marine propulsion plants of the type including two alternative prime movers such as a main turbine and a cruising turbine, one prime mover (hereinafter referred to for convenience as the cruising prime mover) being coupled to the propeller through a unidirectional clutch or freewheel device, while the other prime mover (hereinafter referred to as the main prime mover) can be coupled to the propeller in parallel with the cruising prime mover and the unidirectional clutch. In some such power plants the main prime mover may be permanently coupled to the propeller shaft. It will be appreciated that the cruising prime mover can be engaged to drive the propeller simply by decelerating the main prime mover and accelerating the cruising prime mover until its speed is such that the unidirectional clutch will engage.

It has been found advantageous to provide means for locking the two parts of the unidirectional clutch against relative rotation. Thus the torsional load on the propeller shaft may be subject to considerable fluctuations when the vessel is at sea, and particularly when manoeuvring if the power plant forms part of a twin screw propulsion system, and these load fluctuations may result in the unidirectional clutch "chattering," or engaging and disengaging rapidly, which would be liable to cause damage. If the two parts of the unidirectional clutch are locked however no such chattering can occur and moreover it is then possible to use the cruising turbine in reverse to provide astern drive. It is important however to ensure that the unidirectional clutch is not locked when the main prime mover is in operation since the cruising prime mover would then be over-driven at high speed by the main prime mover, which is most undesirable.

It is an object of the present invention accordingly to provide a control system for a marine power plant of the type referred to, including means for locking the two parts of the unidirectional clutch, which will prevent maloperation of the locking means.

According to the invention therefore a control system for a marine propulsion plant includes two alternative prime movers, a main prime mover coupled to the propeller and a cruising prime mover coupled to the propeller in parallel with the main prime mover through a unidirectional clutch or freewheel device, the clutch or device including a disengageable lock for locking the co-operating driving parts of the clutch against relative rotation, comprising common control means arranged to control the power output and speed of both prime movers so that over one range of control the power output and speed of the main prime mover is controlled and the cruising prime mover is shut down while over another range of control the power output and speed of the cruising prime mover is controlled and the main prime mover is shut down, and an interlock between the unidirectional clutch and the common control means to restrict control by the common control means in dependence upon the engagement or disengagement of the clutch lock.

The interlock may act to prevent operation of the common control means beyond a predetermined limit in a sense to increase the power output of the main prime mover, unless the clutch lock is disengaged. Alternatively or in addition, the interlock may act to prevent operation of the common control means beyond a predetermined limit in a sense to energise the cruising prime mover, unless the lock has been engaged.

According to a preferred feature of the invention the system includes a manual lock-selector control for engaging and disengaging the clutch lock and an additional interlock between this manual control and the common control means, to prevent the lock being engaged until the common control means is moved into its range of control corresponding to control of the power output of the cruising prime mover and shut down of the main prime mover.

The control system may also include an interlock between the manual control and the common control means arranged to prevent the clutch lock being disengaged until the common control means has moved into a limiting position in the range of control in which the cruising prime mover power output is being controlled in which the cruising prime mover is developing substantially full power.

The invention also consists in a marine propulsion unit of the type referred to, incorporating a control system as defined above.

The invention may be performed in various different ways and one specific embodiment will now be described by way of example, with reference to the accompanying drawings, in which.

Figure 1:
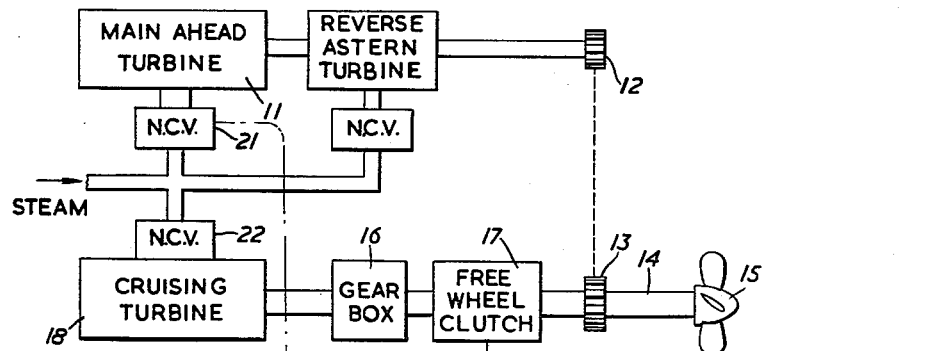
FIGURE 1 shows a general layout of the propulsion plant.

In this example the power plant comprises a main ahead steam turbine 11 permanently coupled through reduction gearing 12, 13 to a propeller shaft 14 on which is mounted a marine propeller 15.

The propeller shaft 14 is also connected through reduction gearing 16 and a unidirectional clutch 17 to a relatively low powered cruising turbine 18. Since the power absorption characteristics of a marine propeller provide an absorption torque which is approximately proportional to the speed of rotation, it will be understood that the maximum speed of the propeller 15 when driven by the cruising turbine 18 is considerably below its speed when driven by the relatively high-powered main turbine 11. A reversing turbine may be provided permanently coupled to the main turbine 11, or alternatively the crusing turbine 18 itself may be designed for reverse operation.

The main and cruising turbines are steam-operated and their power outputs and speeds controlled in well known manner by two series of nozzle control valves 21, 22 which are opened successively and progressively to increase the rate of steam delivered to each turbine. The nozzle control valves of the two turbines are arranged to be controlled by a common master turbine control wheel 23 on a common camshaft, so arranged that over approximately half its rotational range of movement the the cruising turbine nozzle control valves 22 are progressively opened, the main turbine control valves 21 being fully closed; while over the remaining half of the range of movement of the camshaft the main turbine nozzle control valves 21 are progressively opened while the cruising turbine nozzle control valves are fully closed 22. Starting at the low speed end of the cruising turbine range, the power output of the cruising turbine is progressively increased up to a point closely adjacent to the start of the main turbine range. At this point the steam to the cruising turbine 18 is reduced, only one nozzle valve remaining open, the purpose of this being explained below.

The unidirectional clutch or free wheel device 17 between the cruising turbine and the propeller shaft 14 is so arranged that the propeller shaft can over-run the cruising turbine when the propeller is being driven by the main turbine 11. The clutch may be of any known kind and will not be described in detail. (One convenient construction is illustrated and described in U.S. Patent Ser. No. 2,699,855.) The clutch is provided with a disengageable lock in the form of an axially-movable locking sleeve 24 which is splined to one of the relatively movable parts of the clutch and is provided with dogs engaging corresponding dogs on the other part of the clutch so that by axial movements of the locking sleeve the two parts of the clutch can be locked relatively to one another. The locking sleeve 24 is also provided with one or more abutments engaging a moving part of the clutch 17 such that continued movement of the locking sleeve in a direction past its disengaged or unlocked position will act on this moving part of the clutch to retain it permanently out of engagement with the other part of the clutch so that the clutch is then permanently disengaged.

The control system according to the present invention includes a servo system for engaging or disengaging the locking sleeve 24 on the clutch. This servo system includes a reversible hydraulic servo ram 25 having a piston 26 connected to a pivoting clutch lever 27, which is in turn connected to the locking sleeve to move the sleeve in an axial direction into its "lock-in" or "lock-free" positions.

Figure 2:
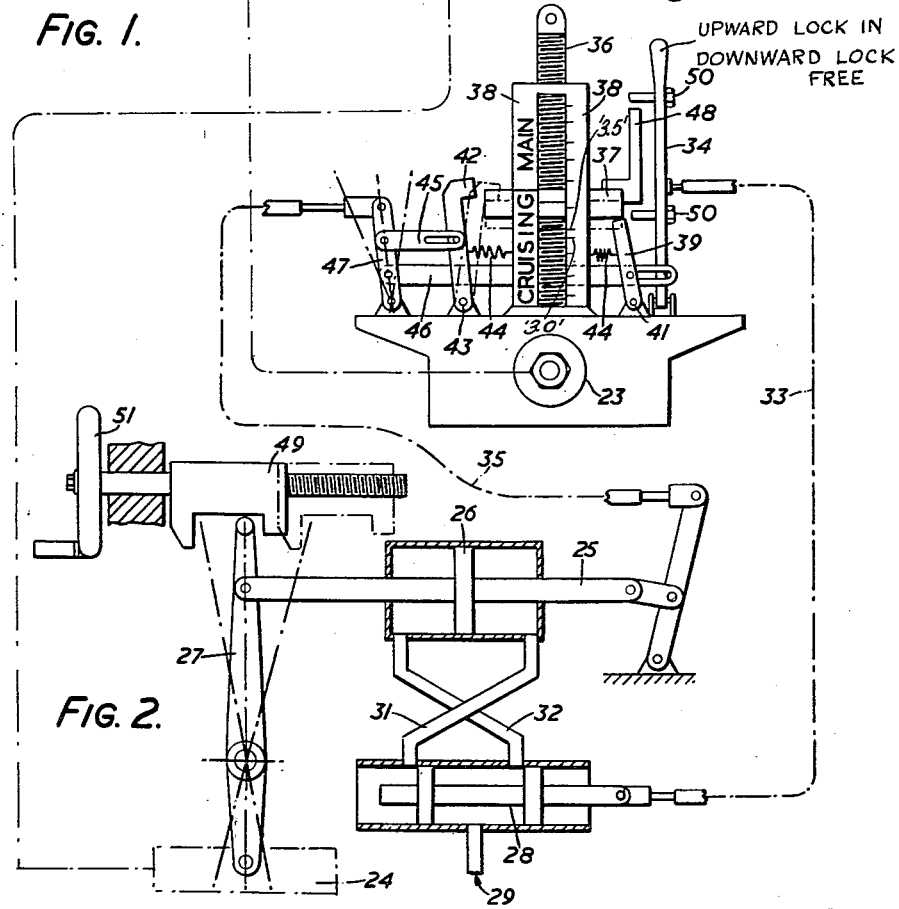
FIGURE 2 shows diagrammatically the arrangement of the various interlocks.

The servo ram 25 is controlled by a reversing servo valve 28 having a pressure inlet 29 from a source of servo oil under pressure and two pressure connections 31, 32 to opposite sides of the ram piston, the arrangement being such that movements of the servo valve 28 connect one end of the ram 25 to the pressure supply while the opposite end is connected to relief and vice versa. The servo valve 28 is controlled through a remote control device such as a flexible Bowden cable 33 to a manual lock selector lever 34 mounted adjacent the main turbine control wheel 23 and movable out of the plane of FIGURE 2 to a "Lock In" position or into the plane of the figure to a "Lock Free" position. The latter movement pulls the cable 33 to move the valve 28 to the right. The ram 25 is also connected through a remote control linkage such as a Bowden cable 35 to interlock mechanism associated with the turbine control gear.

The turbine nozzle control valve camshaft is connected to rotate with a vertical screwthreaded shaft or lead screw 36 on which is mounted a screwthreaded nut 37, the nut engaging in vertical guides 38 so as to be restrained against rotation. The arrangement is such that movements of the nozzle control camshaft cause the nut to move vertically on the guides, the lower half of its range of movement corresponding to the progressive opening of the cruising nozzle turbine control valves while the upper half of its range of movement corresponds to the progressive opening of the main turbine control valves. The guides 38 are provided with corresponding markings which reading upwards from the bottom are 0–4 in the cruising range followed by 0–4, in the main turbine range. The nut therefore acts as an indicator to show the instantaneous position of the nozzle control valve camshaft.

The nut 37 is also employed as part of an interlock system. This interlock system includes a "down stop" comprising a lever 39 pivotally attached at 41 to a rigid base on a horizontal axis and capable of pivotal movement towards and away from the path of the nut, and an "up stop" in the form of a lever 42 having a hooked upper end, this lever being also pivotally connected at 43, to a base on a horizontal axis. The dimensions and position of the down stop lever 39 are such that when it is swung into the path of the nut 37, the nut cannot be lowered below a position corresponding to 3.5 on the cruising turbine range. When the nut is in this position, the hooked formation on the up stop lever 42 cannot yet engage the upper side of the nut. If the down stop lever 39 is withdrawn from the path of the nut, however, and the nut is moved downwards to position 3.0 of the cruising turbine range, the up stop lever 42 can then pivot towards the path of the nut, so that its hooked formation engages the upper surface thereof to prevent the nut being moved upwards.

The two stop levers are positioned on opposite sides of the vertical lead screw 36 and are urged inwards towards one another into the path of the nut by means of a tension spring 44 connected to the two levers. The two levers are also connected by horizontal links 45, 46 to a stop operating lever 47 which is in turn connected through the above mentioned Bowden cable 35 to the servo piston 26 connected to the clutch locking sleeve. The two horizontal links 45, 46 are provided with pin and slot connections to the two stop levers 42, 39 and the arrangement is such that in one position of the stop operating lever 47 the up stop lever is positively withdrawn from the path of the nut while the down stop lever is allowed to swing into the path of the nut under the influence of the tension spring. In the other extreme limiting position of the stop operating lever the down stop lever 39 is positively withdrawn from the path of the nut and the up stop lever 42 is urged into its engaged position by means of the tension spring 44. The Bowden cable connection 35 between the operating lever and the servo ram piston is such that when the locking sleeve of the clutch is engaged, the down stop lever 39 is withdrawn from the path of the nut, while when the clutch locking sleeve is freed, the up stop lever 42 is withdrawn.

In operation, with the propeller 15 being driven by the main turbine 11 the indicator nut will be in the upper range of its movement and the lock selector lever 34 will be in the lock-free position. Since the locking sleeve will thus be in the free position the up stop 42 will be withdrawn clear of the nut and the down stop 39 will be held in position in the path of the nut. During such operation under the main turbine the propeller shaft 14 will over-run the cruising turbine 18 which is stationary. In order to reduce power and transfer the drive from the main to the cruising turbine, the turbine nozzle control wheel 23 and camshaft will be rotated in the closing direction to shut off steam from the main turbine until the nut reaches the position 3.5 in the crusing turbine range, when the nut engages with the down stop. At this position one of the cruising turbine nozzle control valves, which opens in advance of the remaining cruising turbine steam nozzle valves when reducing the power, is passing steam to the cruising turbine at about 300 lbs. per square inch. This pressure is sufficient to cause the cruising turbine to accelerate up to approximately 8250 r.p.m. that is to say, the cruising turbine side of the unidirectional clutch 17 will be rotated at a higher speed than the propeller side of the clutch. The unidirectional clutch will therefore automatically engage 17. Since the acceleration of the crusing turbine at this speed with this nozzle setting is comparatively low, no excessive torque or shock will occur at the engagement of the clutch.

The engagement of the clutch is shown by an indicator light, and immediately engagement has occurred, but not before, the manual lock selector lever 34 is moved by the operator to the lock-in position. This movement operates the servo valve piston 28, and hence the servo ram piston 26 moves the locking sleeve to the lock-in position. This movement of the servo ram piston is transmitted through the second Bowden cable 35 to the stop operating lever 47 which then withdraws the down stop 39 from the path of the nut and also frees the up stop 42 to be moved into the path of the nut under the influence of the tension spring 44. Thus until the locking sleeve has been engaged it is impossible to move the turbine control camshaft further into the cruising turbine range. Further movement of the turbine nozzle control wheel 23 and camshaft then brings the nut 37 into the cruising turbine range and the drive to the propeller 15 is taken over by the cruising turbine 18.

A further interlock device (48, 50) is provided between the manual lock selector lever 34 and the nut 37. This consists of a vertical bar 48 on the nut 37 which co-operates with two studs 50 on the lever 34. In the main turbine range the upper stud 50 is behind the bar 48 which stops the lever 35 from being moved out of the plane of the figure to the lock-in position. Similarly in the cruising turbine range the lower stud 50 is in front of the bar 48 which stops the lever 34 being moved back into the lock-free position. Between these two conditions the bar 48 is in the intermediate position shown in FIGURE 2 and does not restrict movement of the lever 34.

When increasing power and transferring the drive from the cruising turbine 18 to the main turbine 11, the turbine nozzle control wheel 23 is rotated until the nut 37 engages the underside of the hooked formation on the up stop lever 42. The nut is then approximately in a position 3.0 in the cruising turbine range which represents maximum output from the cruising turbine. The interlock between the nut 37 and the lock selector lever 34 then allows the lock selector lever to be moved to the lock-free position so reversing the oil pressure on the servo ram piston 26 and disengaging the locking sleeve 24. This movement of the ram piston is transmitted through the Bowden cable 35 to the stop operating lever 47 which withdraws the upstop lever 42 from the path of the nut and simultaneously frees the down stop lever 39 to be moved into the path of the nut under the influence of the tension spring 44. Only when the up stop lever has been withdrawn can the turbine nozzle control wheel 23 be further rotated in order to open the control nozzles of the main turbine 11. As the nut moves upwards beyond the range of the cruising turbine the cruising turbine nozzles are closed and the main turbine takes up the drive to the propeller, the unidirectional clutch 17 automatically disengaging to allow the propeller 15 to over-run the cruising turbine 18.

The limits of movements of the locking sleeve 24 on the clutch are determined by an adjustable abutment 49 under the control of an emergency handwheel 51. In the normal position of this emergency handwheel the two limits of movement of the locking sleeve 24 correspond simply to the locked and unlocked positions of the sleeve (as shown by solid lines in FIGURE 2). When the abutment 49 is shifted under control of the emergency handwheel 51 the locking sleeve 24 is, however, moved beyond the lock-free position (to the left in FIGURE 2) into a position where the clutch is permanently disengaged.

What we claim as our invention and desire to secure by Letters Patent is:

1. A control system for marine propulsion plant including two alternative prime movers, a main prime mover coupled to the propeller and a cruising prime mover coupled to the propeller in parallel with the main prime mover through a freewheel device including a clutch having driving and driven parts, the freewheel device including a disengageable clutch lock for locking the co-operating driving and driven parts of the clutch against relative rotation, comprising common control means coupled to said prime movers for controlling the power output and speed of both prime movers to give one range of control over which the power output and speed of the main prime mover is controlled and the cruising prime mover is shut down and another range of control over which the power output and speed of the cruising prime mover is controlled and the main prime mover is shut down, and an interlock means between said clutch and said common control means for restricting control by the common control means in accordance with the engagement or disengagement of said clutch lock.

2. A control system as claimed in claim 1 in which said interlock means includes means for preventing operation of said common control means beyond a predetermined limit in a sense to increase the power output of the main prime mover unless said clutch lock is disengaged.

3. A control system as claimed in claim 2 in which said interlock comprises means for preventing operation of the common control means beyond a predetermined limit in a sense to increase the power output of the cruising prime mover unless said clutch lock is engaged.

4. A control system as claimed in claim 3 including a manual lock-selector control connected to said clutch lock for engaging and disengaging said clutch lock and an additional interlock coupled between the manual control and the common control means for preventing said clutch lock from being engaged until the common control means is moved into the range of control corresponding to control of the power output of the cruising prime mover and shut down of the main prime mover.

5. A control system as claimed in claim 4 including manual lock-selector control means connected to said clutch for engaging and disengaging said clutch lock and an additional interlock coupled between the common control means and the manual control preventing the clutch lock being disengaged until the common control means has moved into a limiting position in the range of control in which the cruising prime mover power output is being controlled, in which the cruising prime mover is developing substantially full power.

6. A control system as claimed in claim 1 in which said interlock means for preventing operation of the common control means beyond a predetermined limit in a sense to increase the power output of the cruising prime mover unless the clutch lock is engaged.

7. A control system as claimed in claim 6 including a manual lock-selector control coupled to said clutch lock for engaging and disengaging the clutch lock and an additional interlock means coupled between the manual control and the common control means for preventing the clutch lock from being engaged until the common control means is moved into the range of control corresponding to control of the power output of the cruising prime mover and shut down of the main prime mover.

8. A control system as claimed in claim 7 including a manual lock-selector control coupled to said clutch lock for engaging and disengaging the clutch lock and an additional interlock coupled between the common control means and the manual control for preventing the clutch lock from being disengaged until the common control means has moved into a limiting position in the range of control in which the cruising prime mover power output is being controlled, in which the cruising prime mover is developing subtantially full power.

9. A control system as claimed in claim 1 including a manual lock-selector control coupled to said clutch lock for engaging and disengaging the clutch lock and an additional interlock coupled between the manual control and the common control means for preventing the clutch lock from being engaged until the common control means is moved into the range of control corresponding to control of the power output of the cruising prime mover and shut down of the main prime mover.

10. A control system as claimed in claim 9 including a manual lock-selector control coupled to said clutch lock for engaging and disengaging the clutch lock and an additional coupled interlock between the common control means and the manual control for preventing the clutch lock from being disengaged until the common control means has moved into a limiting position in the range of control in which the cruising prime mover power output is being controlled, in which the cruising prime mover is developing substantially full power.

11. A control system as claimed in claim 1 including a manual lock-selector control coupled to said clutch lock for engaging and disengaging the clutch lock and an additional interlock coupled between the common control means and the manual control for preventing the clutch lock from being disengaged until the common control means has moved into a limiting position in the range of control in which the cruising prime mover power output is being controlled, in which the cruising prime mover is developing substantially full power.

References Cited in the file of this patent

UNITED STATES PATENTS

| | | |
|---|---|---|
| 1,296,378 | Fottinger | Mar. 4, 1919 |
| 2,419,807 | Wilcox | Apr. 29, 1947 |
| 2,419,810 | Beall | Apr. 29, 1947 |
| 2,444,364 | Panish | June 29, 1948 |
| 2,851,113 | Irwin et al. | Sept. 9, 1958 |

FOREIGN PATENTS

| | | |
|---|---|---|
| 704,467 | Great Britain | Feb. 24, 1954 |